3,558,493
LITHIUM FERRITES
Donald G. Wickham, Malibu, Calif., assignor to Ampex Corporation, Redwood City, Calif., a corporation of California
No Drawing. Filed May 5, 1969, Ser. No. 821,957
Int. Cl. C04b *35/26;* C01d *11/02;* C01g *49/00*
U.S. Cl. 252—62.61                4 Claims

ABSTRACT OF THE DISCLOSURE

In making lithium ferrites wherein lithium carbonate or oxide is combined with an iron oxide, processing time is materially reduced by incorporating lithium chloride in the mixture. The lithium chloride causes the lithium carbonate to become very reactive and attack the iron oxide rapidly. After firing to form the desired lithium ferrite, the lithium chloride is dissolved out of the mass with water or other solvent.

SUMMARY OF THE INVENTION

In manufacturing lithium ferrites, the usual source of lithium is lithium carbonate which is readily available and inexpensive. In the making of such ferrites, the lithium carbonate and iron oxide are first placed in a ball mill together with a suitable liquid such as isopropyl alcohol and milled until the balls reduce the particles to a very fine state of subdivision forming an intimate mixture of the iron and lithium compounds. The mixture is then dried and the solid heated to a high temperature to cause the lithium carbonate and iron oxide to react to form the desired lithium ferrite as is well known to those skilled in the art. This procedure is very time consuming and ball milling on the order of days is frequently necessary to form the desired intimate mixture. Further, because of the long ball milling, the product is subject to contamination from the balls and the container.

In accordance with the present invention, all ball milling time and its attendant difficulties can be avoided by adding lithium chloride to a mixture of lithium carbonate and iron oxide. When such a mixture is heated, the lithium carbonate dissolves completely in the fused lithium chloride and the dissolved lithium carbonate has been found to be in a very reactive state and attacks the iron oxide rapidly with the formation of the desired lithium ferrite.

The starting materials, lithium carbonate, iron oxide and lithium chloride should be well mixed but the degree of mixing achieved by the use of a ball mill is not required. Instead, it is only necessary to take the commercially available fine powders mix them together in a dry blending operation and then heat to form the desired ferrite. The lithium chloride remains unchanged and at the conclusion of the heating can be easily dissolved out of the lithium ferrite by means of water or a non-aqueous solvent such as methanol. The lithium ferrite powder thus prepared is then further treated as is well known to those skilled in the art to prepare ceramic magnetic devices.

The quantity of the lithium chloride which is employed is not critical except that a sufficient quantity must be used to dissolve all of the lithium carbonate. On the other hand, if too large a quantity is used, the lithium carbonate will not be brought intimately into contact with the iron oxide and the carbonate would then have to difuse a relatively long distance to the surface of the iron oxide particles. Further, if a large excess were used, an excessive leaching time would be necessary to dissolve out all of the unreacted lithium chloride and this is undesirable since the lithium ferrite is dissolved to a small extent by water. This can be largely avoided by using a non-aqueous solvent such as methanol or isopropanol. In general it has been found that from two to eight mols of the lithium chloride should be used for each mol of lithium carbonate.

The following non-limiting examples illustrate preferred embodiments of the invention.

Example 1

One gram-formula-weight of pure lithium ferrite, $Li_{0.5}Fe_{2.5}O_{4.0}$ is prepared as follows: 18.47 g. of lithium carbonate $Li_2CO_3$; 199.62 g. of iron oxide, $Fe_2O_3$; and 53.0 g. of lithium chloride, LiCl, are placed in a one-quart mixing jar. The jar is rotated for about one hour until the three raw materials are well mixed. The mixture is placed in a suitable crucible and heated to a temperature of approximately 800° C. and kept at this temperature for approximately one hour. The crucible should be well covered to prevent the evaporation of lithium chloride. A homogeneous liquid phase is formed consisting of a solution of lithium carbonate in lithium chloride. The dissolved lithium carbonate attacks the solid iron oxide very rapidly converting it to lithium ferrite. The crucible is removed from the furnace and when cool the contents are removed from the crucible. The lithium chloride, which remains unchanged is extracted with water, leaving a residue of lithium ferrite. The lithium ferrite powder which is recovered can be further treated as required to prepare ceramic magnetic devices.

Example 2

The iron oxide while undergoing reaction with dissolved lithium carbonate exists in a very reactive state and will readily react with small quantities of other raw materials. For example, the substituted lithium ferrite with the chemical formula $Li_{0.45}Ni_{0.10}Mn_{0.20}Fe_{2.25}O_4$, can be readily prepared. To prepare one gram-formula-weight one proceeds as follows: The raw materials, 16.62 g. $Li_2CO_3$; 7.471 g. nickel oxide, NiO; 15.78 g. manganese oxide, $Mn_2O_3$; and 179.66 g. iron oxide, $Fe_2O_3$ and 53 g. LiCl are mixed together and further treated in the same manner exactly as described in the first example. This composition can be used in the preparation of computer memory elements.

I claim:
1. In the process of making a lithium ferrite the steps:
    (a) mixing together lithium carbonate, iron oxide and lithium chloride,
    (b) fusing said mixture whereby a ferrite is formed,
    (c) cooling the mixture and
    (d) extracting lithium chloride from the mixture with a solvent for lithium chloride.
2. The process of claim 1 wherein from two to eight mols of lithium chloride is employed per mol of lithium carbonate.
3. The process of claim 1 wherein the mixture is fused at about 800° C. for about one hour.
4. The process of claim 1 wherein the mixture also contains nickel and manganese oxides.

References Cited
UNITED STATES PATENTS

| | | | |
|---|---|---|---|
| 2,935,411 | 5/1960 | Robinson | 252—62.61X |
| 3,305,301 | 2/1967 | Remeika | 23—51 |
| 3,376,227 | 4/1968 | Van Driel et al. | 252—62.61 |

OTHER REFERENCES

Harrison, "Research", vol. 12, 1959, pp. 395–403.

HERBERT T. CARTER, Primary Examiner

U.S. Cl. X.R.

23—51